(12) United States Patent
Gainey, Jr. et al.

(10) Patent No.: US 9,330,042 B2
(45) Date of Patent: *May 3, 2016

(54) DETERMINING EXTENDED CAPABILITY OF A CHANNEL PATH

(71) Applicant: International Business Machines Corporation, Armonk, NY (US)

(72) Inventors: Charles W. Gainey, Jr., Poughkeepsie, NY (US); Daniel F. Casper, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/604,151

(22) Filed: Jan. 23, 2015

(65) Prior Publication Data

US 2015/0134874 A1    May 14, 2015

Related U.S. Application Data

(63) Continuation of application No. 14/077,718, filed on Nov. 12, 2013, now Pat. No. 8,977,793, which is a continuation of application No. 13/833,378, filed on Mar. 15, 2013, now Pat. No. 8,838,860, which is a continuation of application No. 12/030,912, filed on Feb. 14, 2008, now Pat. No. 8,478,915.

(51) Int. Cl.
*G06F 3/00* (2006.01)
*G06F 13/12* (2006.01)
(Continued)

(52) U.S. Cl.
CPC .............. *G06F 13/4022* (2013.01); *G06F 3/00* (2013.01); *G06F 3/002* (2013.01); *G06F 3/0635* (2013.01); *G06F 13/12* (2013.01); *G06F 13/4282* (2013.01); *G06F 2213/4004* (2013.01)

(58) Field of Classification Search
CPC . H04L 49/357; H04L 1/0057; H04L 12/4633; H04L 2212/0025; H04L 1/0084; H04L 41/08; H04L 49/3009; H04L 29/12009; H04L 29/12886; H04L 41/0806; H04L 41/0886; H04L 61/6045; H04L 69/08; H04L 2203/006; H04J 3/1617

USPC .......... 710/5, 11, 14, 20, 28, 62, 72, 74, 107, 710/113; 711/4, 112, 154; 370/389, 412, 370/476

See application file for complete search history.

(56) References Cited

U.S. PATENT DOCUMENTS 3,693,161 A    9/1972    Price et al.
3,943,283 A    3/1976    Caragliano et al.
(Continued)

FOREIGN PATENT DOCUMENTS

DE    3931514    3/1990
GB    1264096    2/1972
(Continued)

OTHER PUBLICATIONS

U.S. Appl. No. 13/784,132, Non-final Office Action dated Mar. 7, 2014, 73 pages.
(Continued)

*Primary Examiner* — Farley Abad
*Assistant Examiner* — Henry Yu
(74) *Attorney, Agent, or Firm* — Cantor Colburn LLP; Steven Chiu

(57) ABSTRACT

A computer program product includes a tangible storage storing instructions for performing a method. The method includes: sending a request from a processing unit in a host computer system to a channel subsystem to provide a channel path description for a channel path, the channel subsystem including a channel configured to be coupled to a control unit via the channel path and configured to control information transfer between the channel subsystem and the I/O device; and receiving channel path capability information by the processing unit, the capability information specified by a channel path description block including channel path identification and description information, the channel path description block specifying whether the channel path supports a Fiber Channel protocol for commanding an I/O operation, the channel path description block specifying whether the channel path supports an extension to the Fiber Channel protocol based on the channel path supporting the Fiber Channel protocol.

20 Claims, 11 Drawing Sheets

(51) Int. Cl.
  *G06F 13/00* (2006.01)
  *G06F 12/00* (2006.01)
  *H04L 12/28* (2006.01)
  *H04J 3/00* (2006.01)
  *G06F 13/40* (2006.01)
  *G06F 3/06* (2006.01)
  *G06F 13/42* (2006.01)

(56) References Cited

U.S. PATENT DOCUMENTS

| | | |
|---|---|---|
| 4,004,277 A | 1/1977 | Gavril |
| 4,080,649 A | 3/1978 | Calle et al. |
| 4,207,609 A | 6/1980 | Luiz et al. |
| 4,374,415 A | 2/1983 | Cormier et al. |
| 4,380,046 A | 4/1983 | Frosch et al. |
| 4,414,644 A | 11/1983 | Tayler |
| 4,455,605 A | 6/1984 | Cormier et al. |
| 4,497,022 A | 1/1985 | Cormier et al. |
| 4,564,903 A | 1/1986 | Guyette et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,843,541 A | 6/1989 | Bean et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,170,472 A | 12/1992 | Cwiakala et al. |
| 5,185,736 A | 2/1993 | Tyrrell et al. |
| 5,237,325 A | 8/1993 | Klein et al. |
| 5,265,240 A | 11/1993 | Galbraith et al. |
| 5,297,262 A | 3/1994 | Cox et al. |
| 5,301,321 A | 4/1994 | Bell et al. |
| 5,301,323 A | 4/1994 | Maeurer et al. |
| 5,317,739 A | 5/1994 | Elko et al. |
| 5,325,492 A | 6/1994 | Bonevento et al. |
| 5,386,512 A * | 1/1995 | Crisman et al. ............... 709/228 |
| 5,388,219 A * | 2/1995 | Chan et al. .................... 710/5 |
| 5,410,727 A | 4/1995 | Jaffe et al. |
| 5,414,851 A | 5/1995 | Brice, Jr. et al. |
| 5,434,980 A | 7/1995 | Casper et al. |
| 5,440,729 A | 8/1995 | Kimura et al. |
| 5,452,455 A | 9/1995 | Brown et al. |
| 5,461,721 A | 10/1995 | Cormier et al. |
| 5,463,736 A * | 10/1995 | Elko et al. ..................... 710/28 |
| 5,465,359 A | 11/1995 | Allen et al. |
| 5,500,942 A | 3/1996 | Eickemeyer et al. |
| 5,517,670 A | 5/1996 | Allen et al. |
| 5,526,484 A | 6/1996 | Casper et al. |
| 5,528,755 A | 6/1996 | Beardsley et al. |
| 5,539,918 A | 7/1996 | Allen et al. |
| 5,546,533 A * | 8/1996 | Koyama ....................... 714/5.1 |
| 5,548,791 A | 8/1996 | Casper et al. |
| 5,561,809 A | 10/1996 | Elko et al. |
| 5,564,040 A | 10/1996 | Kubala |
| 5,568,648 A | 10/1996 | Coscarella et al. |
| 5,584,039 A | 12/1996 | Johnson et al. |
| 5,600,793 A | 2/1997 | Nord |
| 5,600,805 A | 2/1997 | Fredericks et al. |
| 5,608,898 A * | 3/1997 | Turpin et al. |
| 5,613,163 A | 3/1997 | Marron et al. |
| 5,640,600 A | 6/1997 | Satoh et al. |
| 5,640,603 A | 6/1997 | Meritt et al. |
| 5,644,712 A | 7/1997 | Coscarella et al. |
| 5,671,441 A | 9/1997 | Glassen et al. |
| 5,680,580 A | 10/1997 | Beardsley et al. |
| 5,758,190 A | 5/1998 | Johnson et al. |
| 5,768,620 A | 6/1998 | Johnson et al. |
| 5,787,071 A | 7/1998 | Basso et al. |
| 5,793,983 A | 8/1998 | Albert et al. |
| 5,805,808 A | 9/1998 | Hasani et al. |
| 5,812,877 A | 9/1998 | Young |
| 5,831,985 A | 11/1998 | Sandorfi |
| 5,845,146 A | 12/1998 | Onodera |
| 5,860,022 A | 1/1999 | Kondou et al. |
| 5,894,583 A | 4/1999 | Johnson et al. |
| 5,901,327 A | 5/1999 | Ofek |
| 5,907,684 A | 5/1999 | Halma et al. |
| 5,918,028 A | 6/1999 | Silverthorn et al. |
| 5,996,026 A | 11/1999 | Onodera et al. |
| 6,070,070 A * | 5/2000 | Ladue ............................ 455/419 |
| 6,125,399 A | 9/2000 | Hamilton |
| 6,125,411 A | 9/2000 | Sato |
| 6,128,311 A | 10/2000 | Poulis et al. |
| 6,195,330 B1 | 2/2001 | Sawey et al. |
| 6,202,095 B1 * | 3/2001 | Beardsley et al. ............ 709/227 |
| 6,230,218 B1 * | 5/2001 | Casper et al. .................. 710/20 |
| 6,249,787 B1 | 6/2001 | Schleimer et al. |
| 6,263,380 B1 | 7/2001 | Tsuboi et al. |
| 6,338,105 B1 | 1/2002 | Niizuma et al. |
| 6,343,335 B1 | 1/2002 | Dahman et al. |
| 6,347,334 B1 | 2/2002 | Fredericks et al. |
| 6,351,779 B1 | 2/2002 | Berg et al. |
| 6,353,612 B1 | 3/2002 | Zhu et al. |
| 6,401,223 B1 | 6/2002 | DePenning |
| 6,460,087 B1 | 10/2002 | Saito et al. |
| 6,466,590 B1 | 10/2002 | Park et al. |
| 6,484,217 B1 | 11/2002 | Fuente et al. |
| 6,546,435 B1 | 4/2003 | Yoshimura et al. |
| 6,584,511 B1 | 6/2003 | Marsh, III et al. |
| 6,594,785 B1 | 7/2003 | Gilbertson et al. |
| 6,609,161 B1 | 8/2003 | Young |
| 6,609,165 B1 | 8/2003 | Frazier |
| 6,647,016 B1 * | 11/2003 | Isoda et al. .................... 370/412 |
| 6,651,125 B2 | 11/2003 | Maergner et al. |
| 6,654,954 B1 * | 11/2003 | Hicks ............................ 717/162 |
| 6,658,603 B1 | 12/2003 | Ward |
| 6,687,766 B1 | 2/2004 | Casper et al. |
| 6,693,880 B2 | 2/2004 | Gregg et al. |
| 6,694,390 B1 | 2/2004 | Bogin et al. |
| 6,718,419 B1 | 4/2004 | Delvaux |
| 6,738,647 B1 * | 5/2004 | Link, II ........................ 455/564 |
| 6,751,680 B2 | 6/2004 | Langerman et al. |
| 6,751,683 B1 | 6/2004 | Johnson et al. |
| 6,769,009 B1 | 7/2004 | Reisman |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,898,202 B2 | 5/2005 | Gallagher et al. |
| 6,915,378 B2 | 7/2005 | Roberti |
| 6,922,548 B1 | 7/2005 | Moore et al. |
| 6,950,888 B1 | 9/2005 | Rooney et al. |
| 6,963,940 B1 * | 11/2005 | Glassen et al. ............... 710/107 |
| 7,000,036 B2 | 2/2006 | Carlson et al. |
| 7,003,700 B2 * | 2/2006 | Elko et al. ..................... 714/34 |
| 7,020,810 B2 | 3/2006 | Holman |
| 7,035,540 B2 | 4/2006 | Finan et al. |
| 7,046,665 B1 | 5/2006 | Walrand et al. |
| 7,058,735 B2 | 6/2006 | Spencer |
| 7,085,860 B2 | 8/2006 | Dugan et al. |
| 7,100,096 B2 | 8/2006 | Webb, Jr. et al. |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 | 11/2006 | Fujibayashi |
| 7,142,520 B1 | 11/2006 | Haverinen et al. |
| 7,149,823 B2 | 12/2006 | Miller et al. |
| 7,155,569 B2 | 12/2006 | Johnson et al. |
| 7,164,425 B2 | 1/2007 | Kwak et al. |
| 7,174,274 B2 | 2/2007 | Carlson et al. |
| 7,202,801 B2 | 4/2007 | Chou |
| 7,266,296 B2 | 9/2007 | Ovadia et al. |
| 7,277,387 B2 | 10/2007 | Sanders et al. |
| 7,292,597 B2 | 11/2007 | Mills et al. |
| 7,315,911 B2 | 1/2008 | Davies et al. |
| 7,373,435 B2 | 5/2008 | Carlson et al. |
| 7,382,733 B2 | 6/2008 | Banerjee et al. |
| 7,395,284 B2 | 7/2008 | Sato et al. |
| 7,398,335 B2 | 7/2008 | Sonksen et al. |
| 7,484,021 B2 * | 1/2009 | Rastogi et al. ................. 710/74 |
| 7,500,023 B2 | 3/2009 | Casper et al. |

(56) References Cited

U.S. PATENT DOCUMENTS

| | | | |
|---|---|---|---|
| 7,500,030 | B2 | 3/2009 | Hathorn et al. |
| 7,502,873 | B2 | 3/2009 | Casper et al. |
| 7,512,133 | B2 | 3/2009 | Dugan et al. |
| 7,516,248 | B2 | 4/2009 | Carlson et al. |
| 7,539,777 | B1 | 5/2009 | Aitken |
| 7,543,087 | B2 | 6/2009 | Philbrick et al. |
| 7,555,554 | B2* | 6/2009 | Manders et al. ............... 709/227 |
| 7,558,827 | B2 | 7/2009 | Kawashima et al. |
| 7,564,791 | B2 | 7/2009 | Jayakrishnan et al. |
| 7,577,772 | B2 | 8/2009 | Sonksen et al. |
| 7,577,773 | B1 | 8/2009 | Gandhi et al. |
| 7,594,057 | B1 | 9/2009 | Gandhi et al. |
| 7,599,360 | B2* | 10/2009 | Edsall et al. ................... 370/389 |
| 7,600,053 | B2 | 10/2009 | Carlson et al. |
| 7,630,405 | B1* | 12/2009 | Gao et al. ....................... 370/476 |
| 7,631,128 | B1 | 12/2009 | Sgrosso et al. |
| 7,668,984 | B2 | 2/2010 | Gregg et al. |
| 7,711,871 | B1 | 5/2010 | Haechten et al. |
| 7,743,197 | B2 | 6/2010 | Chavan et al. |
| 7,765,336 | B2 | 7/2010 | Butler et al. |
| 7,826,349 | B2 | 11/2010 | Kaur et al. |
| 7,840,717 | B2 | 11/2010 | Flanagan et al. |
| 7,840,718 | B2 | 11/2010 | Ricci et al. |
| 7,840,719 | B2 | 11/2010 | Casper et al. |
| 7,856,511 | B2 | 12/2010 | Ricci et al. |
| 7,941,570 | B2 | 5/2011 | Flanagan et al. |
| 8,169,938 | B2 | 5/2012 | Duchscher et al. |
| 8,478,915 | B2 | 7/2013 | Gainey, Jr. et al. |
| 8,495,253 | B2 | 7/2013 | Flanagan et al. |
| 2001/0030943 | A1 | 10/2001 | Gregg et al. |
| 2002/0032810 | A1 | 3/2002 | Wagner |
| 2002/0062407 | A1 | 5/2002 | Tateyama et al. |
| 2002/0099967 | A1 | 7/2002 | Kawaguchi |
| 2002/0152338 | A1 | 10/2002 | Elliott et al. |
| 2002/0178404 | A1 | 11/2002 | Austen et al. |
| 2003/0002492 | A1 | 1/2003 | Gallagher et al. |
| 2003/0056000 | A1 | 3/2003 | Mullendore et al. |
| 2003/0084213 | A1 | 5/2003 | Brice, Jr. et al. |
| 2003/0103504 | A1 | 6/2003 | Dugan et al. |
| 2003/0158998 | A1* | 8/2003 | Smith ........................... 711/112 |
| 2003/0187627 | A1 | 10/2003 | Hild et al. |
| 2003/0188053 | A1 | 10/2003 | Tsai |
| 2003/0208581 | A1 | 11/2003 | Behren et al. |
| 2004/0030822 | A1* | 2/2004 | Rajan et al. ........................ 711/4 |
| 2004/0054776 | A1 | 3/2004 | Klotz et al. |
| 2004/0113772 | A1 | 6/2004 | Hong Chou |
| 2004/0125960 | A1 | 7/2004 | Fosgate et al. |
| 2004/0136241 | A1 | 7/2004 | Rapp et al. |
| 2004/0151160 | A1 | 8/2004 | Sanders et al. |
| 2004/0193968 | A1 | 9/2004 | Dugan et al. |
| 2004/0210719 | A1 | 10/2004 | Bushey et al. |
| 2004/0230706 | A1 | 11/2004 | Carlson et al. |
| 2004/0260851 | A1 | 12/2004 | Tu |
| 2005/0018673 | A1 | 1/2005 | Dropps et al. |
| 2005/0102456 | A1* | 5/2005 | Kang ............................. 710/113 |
| 2005/0105456 | A1 | 5/2005 | Cookson et al. |
| 2005/0108251 | A1 | 5/2005 | Hunt |
| 2005/0175341 | A1 | 8/2005 | Ovadia |
| 2005/0193029 | A1* | 9/2005 | Rom et al. .................... 707/200 |
| 2005/0204069 | A1 | 9/2005 | Carlson et al. |
| 2005/0216617 | A1 | 9/2005 | Carlson et al. |
| 2005/0223291 | A1 | 10/2005 | Zimmer et al. |
| 2005/0229033 | A1 | 10/2005 | Tanaka et al. |
| 2005/0257118 | A1 | 11/2005 | Shien |
| 2006/0036769 | A1 | 2/2006 | Frey et al. |
| 2006/0050726 | A1 | 3/2006 | Ahmed et al. |
| 2006/0075154 | A1 | 4/2006 | Carlson et al. |
| 2006/0085595 | A1 | 4/2006 | Slater |
| 2006/0159112 | A1 | 7/2006 | Sundaram et al. |
| 2006/0224795 | A1 | 10/2006 | Muto et al. |
| 2007/0005810 | A1 | 1/2007 | Halleck et al. |
| 2007/0005838 | A1 | 1/2007 | Chang et al. |
| 2007/0016554 | A1 | 1/2007 | Dapp et al. |
| 2007/0061463 | A1 | 3/2007 | Hiramatsu et al. |
| 2007/0072543 | A1* | 3/2007 | Paila et al. .................... 455/3.06 |
| 2007/0079022 | A1 | 4/2007 | Carlson et al. |
| 2007/0079051 | A1 | 4/2007 | Tanaka et al. |
| 2007/0091497 | A1 | 4/2007 | Mizuno et al. |
| 2007/0162631 | A1 | 7/2007 | Balakrishnan et al. |
| 2007/0174544 | A1 | 7/2007 | Yasuda et al. |
| 2007/0239944 | A1 | 10/2007 | Rupanagunta et al. |
| 2007/0294697 | A1* | 12/2007 | Theimer et al. ............... 718/102 |
| 2008/0040519 | A1 | 2/2008 | Starr et al. |
| 2008/0043563 | A1 | 2/2008 | Brice et al. |
| 2008/0059638 | A1 | 3/2008 | Hathorn et al. |
| 2008/0103754 | A1 | 5/2008 | Carlson et al. |
| 2008/0103755 | A1 | 5/2008 | Carlson et al. |
| 2008/0109580 | A1 | 5/2008 | Carlson et al. |
| 2008/0147890 | A1 | 6/2008 | Casper et al. |
| 2008/0183877 | A1 | 7/2008 | Carlson et al. |
| 2008/0235553 | A1 | 9/2008 | Chintada et al. |
| 2008/0256264 | A1 | 10/2008 | Muto et al. |
| 2008/0273518 | A1 | 11/2008 | Pratt et al. |
| 2008/0307122 | A1 | 12/2008 | Butler et al. |
| 2009/0049241 | A1 | 2/2009 | Ohno et al. |
| 2009/0055585 | A1 | 2/2009 | Fernandes et al. |
| 2009/0144586 | A1 | 6/2009 | Casper et al. |
| 2009/0172203 | A1 | 7/2009 | Casper et al. |
| 2009/0172301 | A1* | 7/2009 | Ebersole et al. ............... 711/154 |
| 2009/0201537 | A1 | 8/2009 | Araya |
| 2009/0210557 | A1 | 8/2009 | Gainey, Jr. et al. |
| 2009/0210559 | A1 | 8/2009 | Flanagan et al. |
| 2009/0210560 | A1 | 8/2009 | Yudenfriend et al. |
| 2009/0210561 | A1 | 8/2009 | Ricci et al. |
| 2009/0210562 | A1 | 8/2009 | Huang et al. |
| 2009/0210563 | A1 | 8/2009 | Flanagan et al. |
| 2009/0210564 | A1 | 8/2009 | Ricci et al. |
| 2009/0210570 | A1 | 8/2009 | Bendyk et al. |
| 2009/0210571 | A1 | 8/2009 | Casper et al. |
| 2009/0210572 | A1 | 8/2009 | Yudenfriend et al. |
| 2009/0210573 | A1 | 8/2009 | Yudenfriend et al. |
| 2009/0210576 | A1 | 8/2009 | Casper et al. |
| 2009/0210579 | A1 | 8/2009 | Bendyk et al. |
| 2009/0210580 | A1 | 8/2009 | Bendyk et al. |
| 2009/0210581 | A1 | 8/2009 | Flanagan et al. |
| 2009/0210582 | A1 | 8/2009 | Bendyk et al. |
| 2009/0210583 | A1 | 8/2009 | Bendyk et al. |
| 2009/0210584 | A1 | 8/2009 | Carlson et al. |
| 2009/0210585 | A1 | 8/2009 | Ricci et al. |
| 2009/0210768 | A1 | 8/2009 | Carlson et al. |
| 2009/0210769 | A1 | 8/2009 | Casper et al. |
| 2009/0210884 | A1 | 8/2009 | Ricci et al. |
| 2009/0307388 | A1 | 12/2009 | Tchapda |
| 2010/0014526 | A1 | 1/2010 | Chavan et al. |
| 2010/0030919 | A1 | 2/2010 | Flanagan et al. |
| 2010/0030920 | A1 | 2/2010 | Casper et al. |
| 2010/0064072 | A1 | 3/2010 | Tang et al. |
| 2010/0299460 | A1 | 11/2010 | Wang |
| 2011/0113159 | A1 | 5/2011 | Casper et al. |
| 2011/0173640 | A1 | 7/2011 | Kreuzenstein et al. |
| 2012/0311390 | A1 | 12/2012 | Bubb et al. |
| 2013/0047042 | A1 | 2/2013 | Bubb et al. |

FOREIGN PATENT DOCUMENTS

| | | |
|---|---|---|
| GB | 2291990 | 2/1996 |
| JP | 61123970 A | 6/1986 |
| JP | 63236152 | 10/1988 |
| JP | 2010140127 A | 6/2010 |
| WO | 0235367 A1 | 5/2002 |
| WO | 2006102664 A2 | 9/2006 |

OTHER PUBLICATIONS

U.S. Appl. No. 14/304,383, filed Mar. 13, 2014; Non-final office action mailed Jun. 3, 2014; 15 pages.

Aboda, B.-et al.; Network Working Group; "Securing Block Storage Protocols Over IP"; ACM Digital Library; RFC3723; Apr. 2004, 66 pages.

Azimi, R.-et al.; "miNI: Reducing Network Interface Memory Requirements with Dynamic Handle Lookup"; ACM Digital Library; pp. 261-272; Jun. 2003.

(56) References Cited

OTHER PUBLICATIONS

Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD-Ready Enterprise Platforms"; Google/Intel Corporation; 2008-2009, 7 pages.
Hewlett-Packard Company; HP A4800A PCI FWD SCSI Host Bus Adapter—Service & User Guide, Edition 6; Google/H-P; 2001, pp. 1-64.
Hewlett-Packard Company; "HP A5149 PCI Ultra2 SCSI Host Bus Adapter—Service and User Guide", Edition 2; Google/H-P; 2001, pp. 1-66.
Jiang, J.-et al.; "The Role of FCoE in I/O Consolidation"; ACM Digital Library/International Conf on Advanced Infocomm Technology '08; Jul. 2008, pp. 1-6.
Josephson, WK.-et al.; "DFS: A File System for Virtualized Flash Storage"; ACM Digital Library; vol. 6, No. 3, Article 14, Sep. 2010, pp. 1-15.
LSI Corporation; "PCI Express to 6Gb/s SAS Host Bus Adapters"; Google; Chapter 1, Introduction/Overview; LSI User Guide; Oct. 2009, pp. 1-28.
LSI; "ScsiPortGetDeivceBase"; Google/LSI; Apr. 2003, pp. 1-3.
Magoutis, K.; "The Optimistic Direct Access File System: Design and Network Interface Support"; Division of Engineering & Applied Science, Harvard Univ.; Feb. 2002, pp. 1-7.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007, pp. 1-7.
Petersen, MK.-et al.; "DIF/DIX Aware Linux SCSI HBA Interface"; Google; Oracle Linux Engineering; Jul. 2008, pp. 1-258.
Satran, J.-et al.; Network Working Group; "Internet Small Computer Systems Interface (iSCSI)"; ACM Digital Library; RFC3720; Apr. 2004, pp. 1-258.
Sun, Oracle; "Sun Storage 6 Gb SAS PCIe HBA, External—Installation Guide for HBA Models"; Google; Revision A; Nov. 2010, 80 pages.
U.S. Appl. No. 13/024,468, Non Final Office Action Mailed Jan. 26, 2012, 58 pages.
U.S. Appl. No. 13/351,073, Non Final Office Action Mailed Mar. 30, 2012, 8 pages.
U.S. Appl. No. 12/030,912, Final Office Action Mailed Feb. 27, 2012, 25 pgs.
U.S. Appl. No. 12/031,023, Non-Final Office Action Mailed Feb. 1, 2012, 37 pages.
URL, http://en.wikipedia.org/wiki/FICON, FICON, Wikipedia, USA, Wikimedia Foundation, Inc., Aug. 9, 2011, 3 pages.
U.S. Appl. No. 12/030,912 Non Final Office Action Mailed Aug. 18, 2011, 35 pages.
U.S. Appl. No. 12/030,981 Non Final Office Action Mailed Aug. 2, 201, 59 pages.
U.S. Appl. No. 12/031,042, Non-Final Office Action Mailed Sep. 30, 201, 20 pages.
U.S. Appl. No. 12/031,182 Final Office Action dated Oct. 20, 2011, 10 pages.
U.S. Appl. No. 12/031,182 Non-Final Office Action dated Mar. 16, 2012, 18 pages.
Vaghani, SB.; "Virtual Machine File System"; VMWare Inc./ACM Digital Library; pp. 57-69; 2008-2009.
"Fibre Channel Single Byte Command Code Sets-2 Mapping Protocol (FC-SB-3)" T11/Project 1357-D/Rev 1.6, INCITS Mar. 2003, 206 pgs., American National Standards Institute.
"Information Technology-Fibre Channel Protocol for SCSI, Third Version (FCP-3)," T10 Project 1560-D, Revision 4g, Sep. 13, 2005, 140 pages.
ANSI INCITS 433-2007, Information Technology Fibre Channel Link Services (FC-LS), Jul. 2007, 211 pages.
Behrs, JR, "Adaptive Prediction Minimizes Data Overrun and Underrun", IBM, Nov. 1994, pp. 1-3. http://priorartdatabase.com/IPCOM/000114189.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
Dauby, et al. "Contention Resolution Between Two Processors"; IBM Technical Disclosure Bulletin; vol. 26; No. 10A; Mar. 1984; 3 pages.
DeVeer, J.A.; "Control Frame Multiplexing on Serial I/O Channels"; IBM Technical Disclosure Bulletin; vol. 32; No. 10A; Mar. 1990; pp. 39-40.
Golasky, Richard; "Link-Level Error Recovery With Tape Backup"; Dell Power Solutions; Aug. 2005; pp. 88-91.
Meritt, A.S. and J.H. Sorg, "Correction of Channel Measurement Data Caused by Control Unit Queuing," IBM Technical Disclosure Bulletin, vol. 33, No. 11, Apr. 1991, pp. 100-103.
U.S. Pat. No. 7,373,435 Non-Final Office Action Sep. 13, 2007.
U.S. Pat. No. 7,373,435 Non-Final Office Action Jun. 11, 2007.
U.S. Pat. No. 7,600,053 Non-Final Office Action dated Mar. 17, 2009.
U.S. Appl. No. 12/031,023, Final Office Action Mailed Nov. 18, 2010.
U.S. Appl. No. 12/030,932, Final Office Action Mailed Jul. 23, 2010.
U.S. Appl. No. 12/030,932, Non-Final Office Action Mailed Dec. 16, 2010.
U.S. Appl. No. 12/030,951, Final Office Action Mailed Oct. 26, 2010.
U.S. Appl. No. 12/030,975 Non-Final Office Action dated Oct. 22, 2009.
U.S. Appl. No. 12/030,975. Final Office Action Mailed May 13, 2010.
U.S. Appl. No. 12/030,993, Final Office Action Mailed Dec. 10, 2010.
U.S. Appl. No. 12/031,021 Non-Final Office Action dated Jan. 8, 2010.
U.S. Appl. No. 12/031,201, Final Office Action Mailed Aug. 3, 2010.
U.S. Appl. No. 12/031,201, Non-Final Office Action Mailed Dec. 27, 2010.
U.S. Appl. No. 12/030,912 Non-Final Office Action dated Mar. 18, 2010.
U.S. Appl. No. 12/030,989 Non-Final Office Action dated Oct. 22, 2009.
U.S. Appl. No. 12/030,993 Non-Final Office Action dated Oct. 28, 2009.
U.S. Appl. No. 12/031,023 Non-Final Office Action dated Oct. 29, 2009.
U.S. Appl. No. 12/183,305, filed Jul. 31, 2008.
U.S. Appl. No. 12/183,315, filed Jul. 31, 2008.
U.S. Appl. No. 12/030,951 Non-Final Office Action dated Nov. 23, 2009.
U.S. Appl. No. 12/030,932 Non-Final Office Action dated Dec. 16, 2009.
U.S. Appl. No. 11/126,728 Non-Final Office Action Apr. 16, 2007.
U.S. Appl. No. 11/469,573 Non-Final Office Action dated Apr. 11, 2008.
U.S. Appl. No. 11/965,866 Non-Final Office Action dated Jun. 3, 2010.
U.S. Appl. No. 11/548,060 Non-Final Office Action dated Apr. 15, 2008.
U.S. Appl. No. 11/548,093 Non-Final Office Action dated Apr. 17, 2008.
U.S. Appl. No. 12/030,920 Non-Final Office Action dated Feb. 23, 2010.
U.S. Appl. No. 12/030,939 Non-Final Office Action dated Nov. 16, 2009.
U.S. Appl. No. 12/030,951 Non-Final Office Action dated May 20, 2010.
U.S. Appl. No. 12/030,961 Non-Final Office Action dated Dec. 17, 2009.
U.S. Appl. No. 12/030,985, Non Final Office Action Mailed May 5, 2010.
U.S. Appl. No. 12/031,038 Non-Final Office Action dated Nov. 16, 2009.
U.S. Appl. No. 12/031,038, Non-Final Office Action Mailed Apr. 15, 2010.

(56) References Cited

OTHER PUBLICATIONS

U.S. Appl. No. 12/031,182 Final Office Action Mailed Jul. 22, 2010.
U.S. Appl. No. 12/031,182 Non-Final Office Action dated Jan. 22, 2010.
"Protocol for Insochronous Traffic Over Fiber Channel Switching"; IBM Technical Disclosure Bulletin; vol. 37, No. 06B; Jun. 1994. pp. 377-380.
"z/Architecture-Principles of Operation," IBM Publication No. SA22-7832-04, 5th Ed., Sep. 2005, pp. 1-1144.
IBM, "Method and Apparatus to Monitor PAV Utilization", Feb. 2005, pp. 1-3. http://priorartdatabase.com/IPCOM/000082878.
IBM® z/Architecture Principles of Operation, Publication No. SA22-7832-05, 6th Edition, Apr. 2007. 1,215 pages separated into 4 electronic attachments. Part 1.
IBM® z/Architecture Principles of Operation, Publication No. SA22-7832-05, 6th Edition, Apr. 2007. 1,215 pages separated into 4 electronic attachments. Part 2.
IBM® z/Architecture Principles of Operation, Publication No. SA22-7832-05, 6th Edition, Apr. 2007. 1,215 pages separated into 4 electronic attachments. Part 3.
IBM® z/Architecture Principles of Operation, Publication No. SA22-7832-05, 6th Edition, Apr. 2007. 1,215 pages separated into 4 electronic attachments. Part 4.
International Search Report; International Application No. PCT/EP2009/059184; International filing Date: Jul. 16, 2009; Date of mailing: Jan. 14, 2010; 9 pages.
Laudon et al.,"System Overview of the SGI Origin 200/2000 Product Line," 1997, iEEE Publication pp. 150-156.
Moore et al., Reconfiguration of Storage Elements to Improve Performance, IBM, Dec. 1983, pp. 1-3. http://priorartdatabas.com/IPCOM/000047719.
Nordstrom.; "Sequence Reception Method for a Fibre Channel Protocol Chip"; IBM Technical Disclosure Bulletin; vol. 38, No. 12; Dec. 1995; pp. 267-269.
U.S. Pat. No. 7,000,036 Non-Final Office Action dated Jul. 15, 2005, 1 page.
U.S. Pat. No. 7,174,274 Non-Final Office Action dated Jun. 8, 2006, 1 page.
Peterson; "Information Techonology, Fibre Channel Protocol for SCSI, Fourth Version (FCP-3)", Draft Proposed American National Standard, Jun. 2004; pp. 1-142.
Sachs, M.W.; "I/O Marker Changing"; IBM Technical Disclosure Bulletin; vol. 37, No. 02A; Feb. 1994; pp. 75-76.
SCSI Primary Commands—4 (SPC-4); Project T10/1731-D. Rev 11. INCITS Apr. 14, 2010, 785 pages (Part 1, pp. 1-390; Part 2, pp. 391-785).
Simmons et al.; "A Performance Comparison of Three Supercomputers: Fujitsu VP-2600, NEC SX-3, and CRAY Y-MP"; ACM, Conference on High Performance Networking and Computing, Jul. 1991 ACM/IEEE conference on Supercomputing, Albuquerque, NM; pp. 150-157.
Snively, et al.; "Fibre Channel, Framing and Signaling"; (FC-FS) Rev. 1.70; NCITS Working Draft Proposed American National Standard for Information Technology; Feb. 2002; pp. 1-575.
Snively, et al.; "Fibre Channel Single Byte Command Code Sets-3 Mapping Protocol (FC-SB-3)"; T11/Project 1357-D/Rev. 1.6, INCITS; Mar. 2003; pp. 1-206.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When The CRC and TCP Checksum Disagree"; SIGCOMM '00, Stockholm, Sweden; Jul. 2000; 10 pages.
Tachikawa, T., et al. "ARQ protocols for bi-directional data transmission," Information Networking, 1998 (ICOIN-12) Proceedings., Twelfth International Conference on., Vol., No., pp. 468-473, Jan. 21-23, 1998.
U.S. Appl. No. 12/030,954 Non-Final Office Action dated Jan. 21, 2010, 20 pages.
U.S. Appl. No. 12/031,201 Non-Final Office Action dated Jan. 25, 2010, 14 pages.
U.S. Appl. No. 12/183,323, Non-Final Office Action Mailed Jan. 3, 2011, 18 pages.
U.S. Appl. No. 12/031,042, Final Office Action Mailed Oct. 25, 2010, 27 pages.
U.S. Appl. No. 12/183,323, filed on Jul. 31, 2008, 54 pages.
U.S. Appl. No. 12/364,615, Non Final Office Action Mailed Oct. 7, 2010, 51 pages.
U.S. Appl. No. 12/030,954 Non Final Office Action mailed Jul. 12, 2010, 36 pages.
U.S. Appl. No. 12/030,961 Final Office Action mailed Jul. 12, 2010, 35 pages.
U.S. Appl. No. 12/030,989 Final Office Action dated May 24, 2010, 28 pages.
U.S. Appl. No. 12/030,993 Non Final Office Action mailed Jun. 28, 2010, 24 pages.
U.S. Appl. No. 12/031,023 Non Final Office Action mailed Jun. 11, 2010, 20 pages.
U.S. Appl. No. 12/031,042, Non-Final Office Action Mailed Apr. 5, 2010, 30 pages.
U.S. Appl. No. 12/183,305, Non-Final Office Action Mailed May 11, 2010, 34 pages.
U.S. Appl. No. 12/183,323 Non Final Office Action mailed Jul. 19, 2010, 42 pages.
Written Opinion and International Search Report for PCT/EP2009/051445 dated Jun. 25, 2009, 11 pages.
Written Opinion and International Search Report for PCT/EP2009/051446 dated Jun. 25, 2009, 8 pages.
Written Opinion and International Search Report for PCT/EP2009/051450 dated Jul. 7, 2009, 7 pages.
Written Opinion and International Search Report for PCT/EP2009/051461 dated Sep. 22, 2009, 7 pages.
Written Opinion and International Search Report for PCT/EP2009/051462 dated Jul. 1, 2009, 9 pages.
Z/Architecture, "Principles of Operation SA 22/7832-01 International Business Machines Corporation," 2nd Edition, Oct. 2001, pp. 1-1024.
Final Office Action for POU920070216US1 U.S. Appl. No. 12/030,912 mailed Oct. 6, 2010, 31 pages.
GB1206682.5 Combined Search and Examination Report under Sections 17 and 18(3). Mailed on Jul. 25, 2012. 14 pages.
Germian Office Action for Application No. 10 2012 209 014.2, Mailed on Apr. 9, 2013, 3 pages.
International Search Report and Written Opinion for PCT/EP2009/051447 dated Jul. 1, 2009, 9 pages.
International Search Report and Written Opinion for PCT/EP2009/051483 dated Jul. 27, 2009, 9 pages.
Iren, et al.; "The Transport Layer: Tutorial and Survey"; ACM Computing Surveys; vol. 31, No. 4; Dec. 1999; pp. 360-405.
Ishikawa, Hikaru, et al. "Bi-Directional OFDM Transmission using Adaptive Modulation that spreads Data Symbols". Power Line Communications and its Applications, 2006, IEEE International Symposium on, Vol., No., pp. 202-207.
U.S. Appl. No. 12/181,662—Final Office Action dated Jan. 4, 2010, 10 pages.
U.S. Appl. No. 12/617,055, Non Final Office Action Mailed Jun. 23, 2011, 8 pages.
Written Opinion and International Search Report for PCT/EP2009/051463 dated Jul. 22, 2009, 9 pages.
U.S. Appl. No. 13/075,993 Non Final Office Action Mailed Jul. 19, 2012, 14 pages.
U.S. Appl. No. 12/030,912, Non Final Office Action Mailed Oct. 4, 2012, 25 pages.
U.S. Appl. No. 13/075,993, Final Office Action Mailed Feb. 13, 2012, 21 pages.
U.S. Appl. No. 13/150,539, Non-Final Office Action Mailed Mar. 2, 2012, 58 pages.
U.S. Appl. No. 13/150,583, Non-Final Office Action Mailed Feb. 3, 2012, 57 pages.

(56) References Cited

OTHER PUBLICATIONS

U.S. Appl. No. 13/173,772 Non Final Office Action Mailed Feb. 3, 2012, 61 pages.

U.S. Appl. No. 13/173,733, Non-Final Office Action Mailed Feb. 7, 2012, 55 pages.

U.S. Appl. No. 12/031,182, Non Final Office Action Mailed Dec. 23, 2010, 11 pages.

Written Opinion and International Search Report for PCT/EP2009/051459 dated Jun. 23, 2009, 8 pages.

* cited by examiner

DETERMINING EXTENDED CAPABILITY OF A CHANNEL PATH

DOMESTIC PRIORITY

This application is a continuation of U.S. patent application Ser. No. 14/077,718, filed on Nov. 12, 2013, which is a continuation of U.S. patent application Ser. No. 13/833,378, filed on Mar. 15, 2013, now U.S. Pat. No. 8,838,860, which is a continuation of U.S. patent application Ser. No. 12/030,912 filed Feb. 14, 2008, now U.S. Pat. No. 8,478,915, the entire disclosures of which are incorporated herein by reference.

BACKGROUND OF THE INVENTION

1. Field of Invention

The present disclosure relates generally to input/output processing, and in particular, to determining extended capability of a channel path in an input/output processing system.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entirety. Further, the channel infers certain information associated with processing the response from the control unit for each command.

Performing I/O processing on a per CCW basis may involve a large amount of processing overhead for the channel subsystem, as the channels parse CCWs, track state information, and react to responses from the control units. Therefore, it may be beneficial to shift much of the processing burden associated with interpreting and managing CCW and state information from the channel subsystem to the control units. Simplifying the role of channels in communicating between the control units and an operating system in the I/O processing system may increase communication throughput as less handshaking is performed. However, altering command sequences, as well as roles of the channel subsystem and the control units, can cause difficulties in interfacing with control units that support different modes of operation in the same I/O processing system.

It would be beneficial to support control units capable of executing commands absent CCW interpretation by the channels, as well as legacy control units that require the channels to parse lists of CCWs. It would also be desirable to support new functionality on a channel path basis as an extension of existing capability, rather than creating an entirely new channel path type. In order to send commands using such a system, it would be advantageous to provide notice of the capability supported by each channel path such that commands can be formatted in compliance with each channel path configuration. Accordingly, there is a need in the art for determining extended capability of a channel path in an I/O processing system.

BRIEF SUMMARY OF THE INVENTION

An embodiment of computer program product for determining extended capability of a channel path in an input/output (I/O) processing system is provided. The computer program product includes a non-transitory tangible storage medium readable by a processing circuit and storing instructions for execution by the processing circuit for performing a method. The method includes: sending a request from a processing unit in a host computer system to a channel subsystem in the host computer system, the request to provide a channel path description for a channel path between the channel subsystem and an I/O device, the channel subsystem including a channel configured to be coupled to a control unit via the channel path, the channel configured to control information transfer between the channel subsystem and the I/O device; and receiving channel path capability information by the processing unit from the channel subsystem in response to the request, the capability information specified by a channel path description block including channel path identification and description information, the channel path description block specifying whether the channel path supports a Fibre Channel protocol for commanding an I/O operation, the channel path description block specifying whether the channel path supports an extension to the Fibre Channel protocol based on the channel path supporting the Fibre Channel protocol.

An embodiment of an apparatus for determining extended capability of a channel path in an input/output (I/O) processing system is provided. The apparatus includes a processing unit in a host computer system, the processing unit configured to control functions of at least a portion of the I/O processing system. The processing unit is configured to perform a method including: sending a request to a channel subsystem in the host computer system, the request to provide a channel path description for a channel path between the channel subsystem and an I/O device, the channel subsystem configured to communicate with a control unit via the channel path, the channel subsystem including a channel configured to be coupled to the control unit via the channel path, the channel configured to control information transfer between the channel subsystem and an I/O device; and receiving channel path capability information by the processing unit from the channel subsystem in response to the request, the capability information specified by a channel path description block, the channel path description block including channel path identification and description information, the channel path description block specifying whether the channel path supports a Fibre Channel protocol for commanding an I/O operation, the channel path description block specifying whether the channel path supports an extension to the Fibre Channel protocol based on the channel path supporting the Fibre Channel protocol.

A method for determining extended capability of a channel path in an input/output (I/O) processing system is provided. The method includes: sending a request from a processing unit in a host computer system to a channel subsystem in the host computer system, the request to provide a channel path description for a channel path between the channel subsystem and an I/O device, the channel subsystem including a channel configured to be coupled to a control unit via the channel path, the channel configured to control information transfer between the channel subsystem and the I/O device; and receiving channel path capability information by the processing unit from the channel subsystem in response to the request, the capability information specified by a channel path description block including channel path identification and description information, the channel path description block specifying whether the channel path supports a Fibre Channel protocol for commanding an I/O operation, the channel path description block specifying whether the channel path supports an extension to the Fibre Channel protocol based on the channel path supporting the Fibre Channel protocol.

Other computer program products, apparatuses, and/or methods according to embodiments will be or become apparent to one with skill in the art upon review of the following drawings and detailed description. It is intended that all such additional computer program products, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
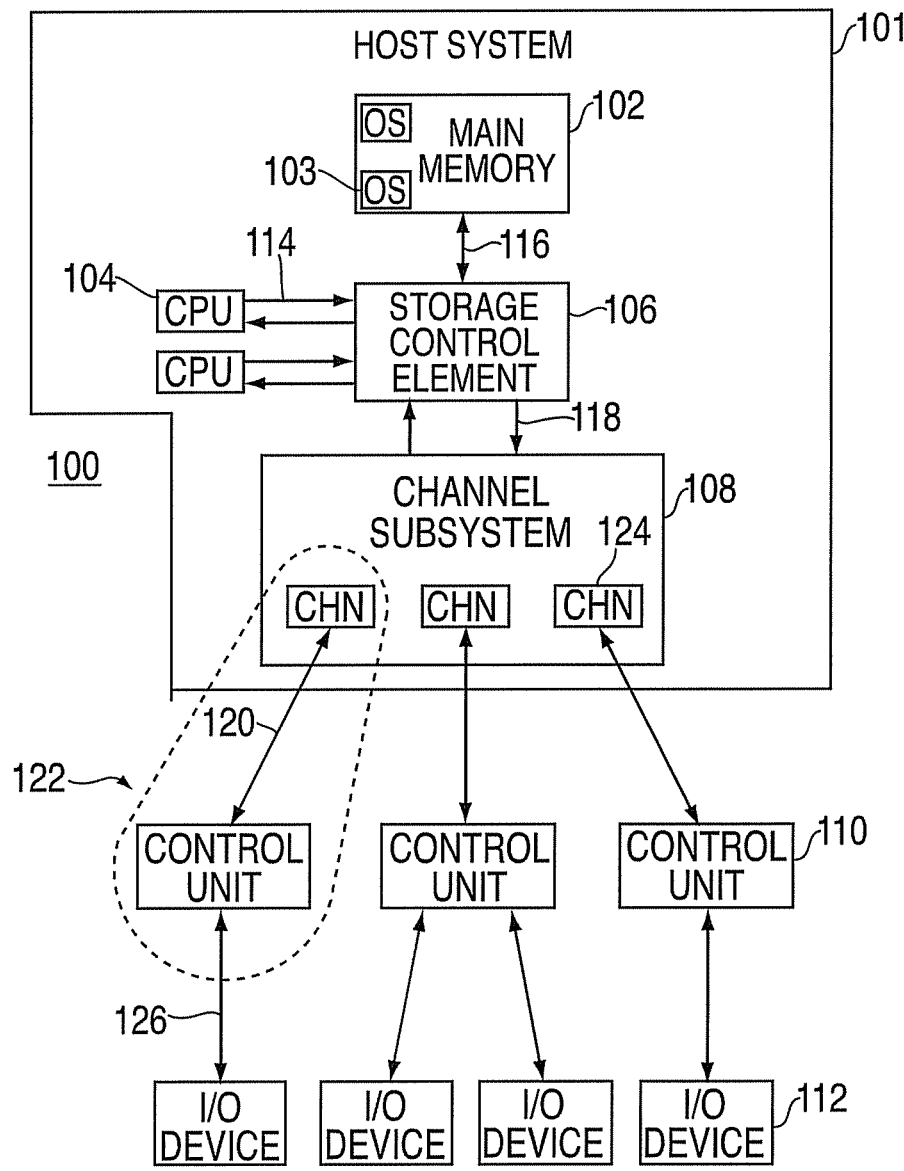
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) processing is facilitated. For instance, I/O processing is facilitated by readily enabling access to information, such as status and measurement data, associated with I/O processing. Further, I/O processing is facilitated, in one example, by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity.

The plurality of commands are included in a block, referred to herein as a transport command control block (TCCB), an address of which is specified in a transport control word (TCW). The TCW is sent from an operating system or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

In an exemplary embodiment, the control unit generates a response message in response to executing the channel program. The control unit may also generate a response message without executing the channel program when an exception condition is detected, such as an error in the channel program that prevents execution. The control unit may include a number of elements to support communication between the I/O communications adapter and I/O devices, as well as in support of channel program execution. For example, the control unit can include control logic to parse and process messages, in addition to one or more queues, timers, and registers to facilitate communication and status monitoring. The I/O communications adapter parses the response message, extracting the status and extended status information, and provides feedback to processing elements of the I/O processing system.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
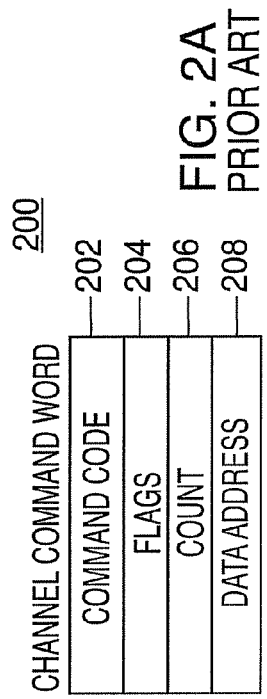
FIG. 2A depicts one example of a prior art channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the read CCW. It fetches the locate record command 305 (FIG. 3) from the locate record CCW 217 (FIG. 2B) and obtains the data from locate record data 220. The read command 306 (FIG. 3) is fetched from read CCW 221 (FIG. 2B). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4 k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to read 4 k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transfer mode indirect data address words (TIDAWs), similar to MIDAWs) that points to data area 406, and a status area 408. TCWs, TCCBs, and status are described in further detail below.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

Figure 5:
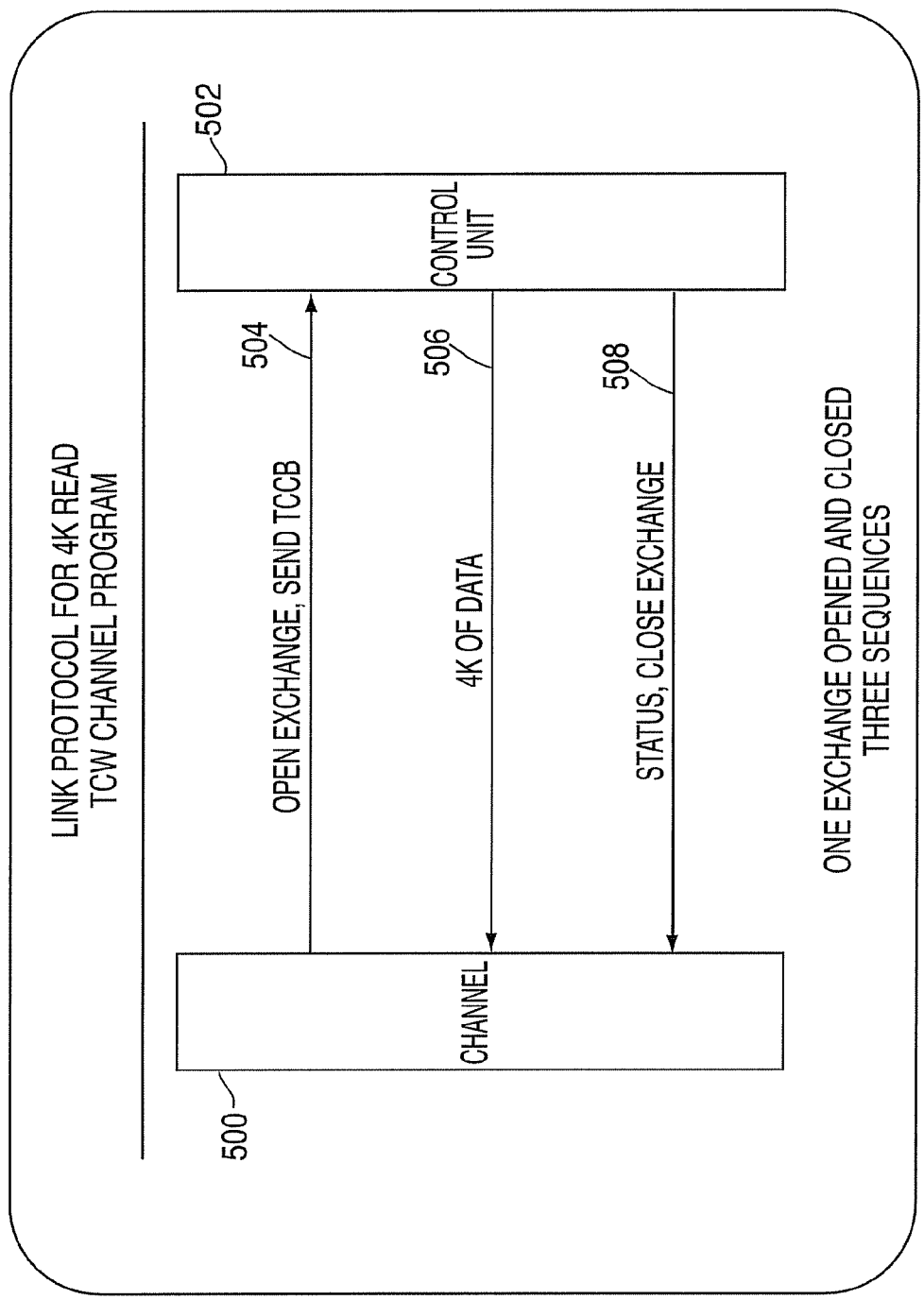
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs, also referred to as descriptor control words)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP_RSP IU, also referred to as a transport response IU. The FCP_RSP IU payload may be used to transport FICON ending status along with additional status information, including parameters that support the calculation of extended measurement words and notify the channel 500 of the maximum number of open exchanges supported by the control unit 502.

In a further example, to write 4k of customer data, the channel 500 uses the FCP link protocol phases, as follows:
1. Transfer a TCCB in the FCP_CMND IU.
2. Transfer the IU of data, and sequence initiative to the control unit 502. (FCP Transfer Ready Disabled)
3. Final status is sent in a FCP status frame that has a bit active in, for instance, byte 10 or 11 of the FCP_RSP IU Payload. The FCP_RSP_INFO field or sense field is used to transport FICON ending status along with additional status information, including parameters that support the calculation of extended measurement words and notify the channel 500 of the maximum number of open exchanges supported by the control unit 502.

Figure 2B:
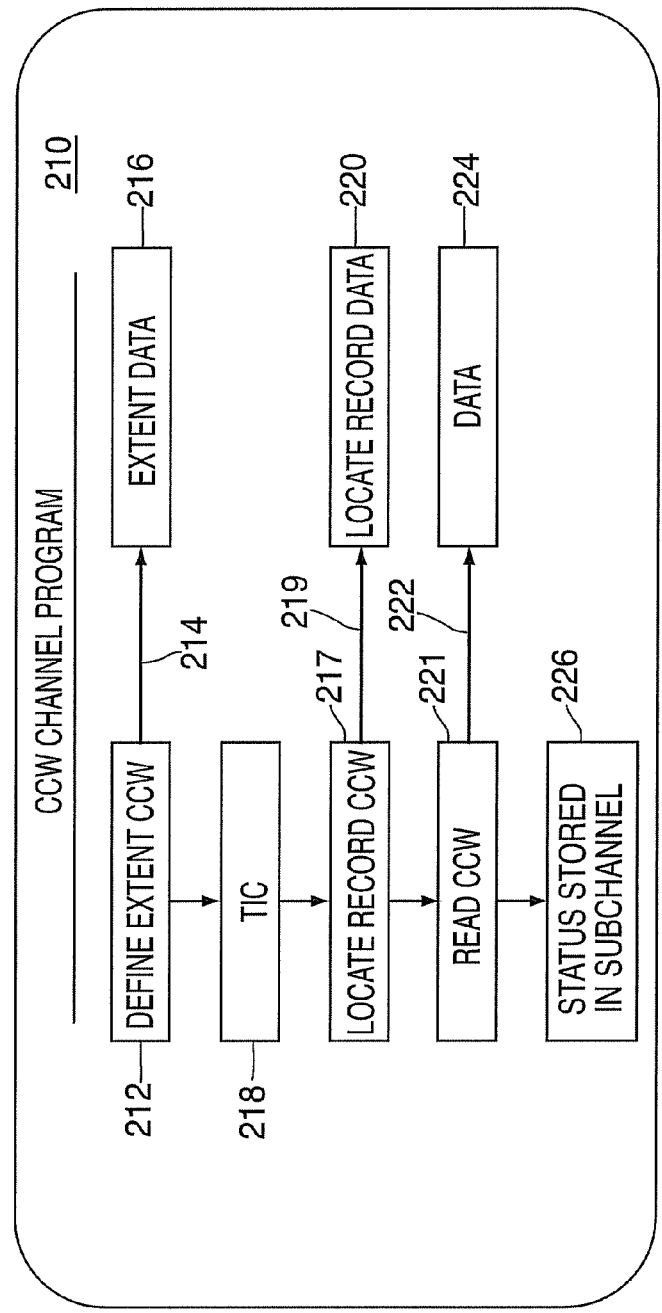
FIG. 2B depicts one example of a prior art channel command word channel program.
Figure 3:
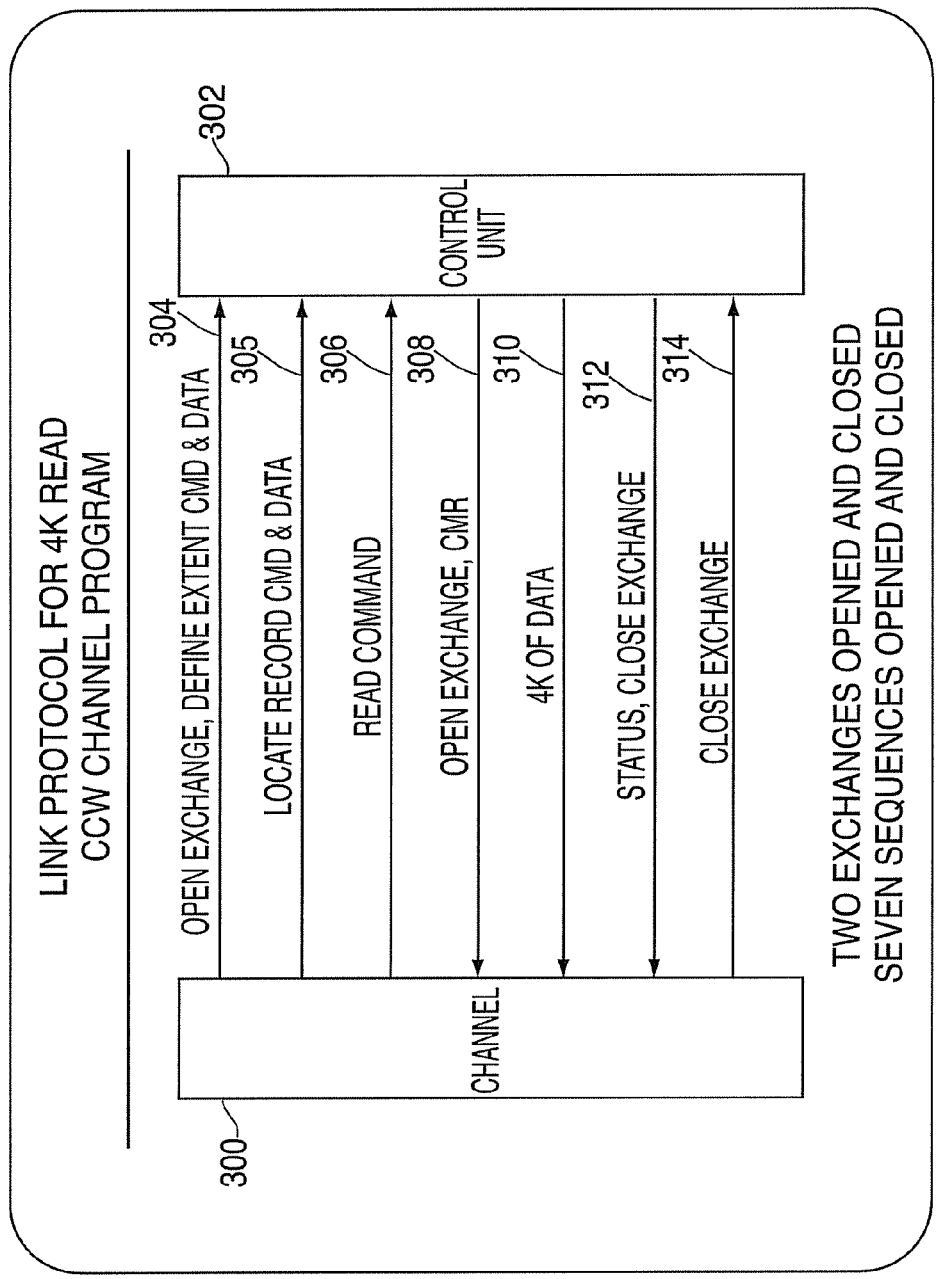
FIG. 3 depicts one embodiment of a prior art link protocol used in communicating between a channel and control unit to execute the channel command word channel program of FIG. 2B.
Figure 4:
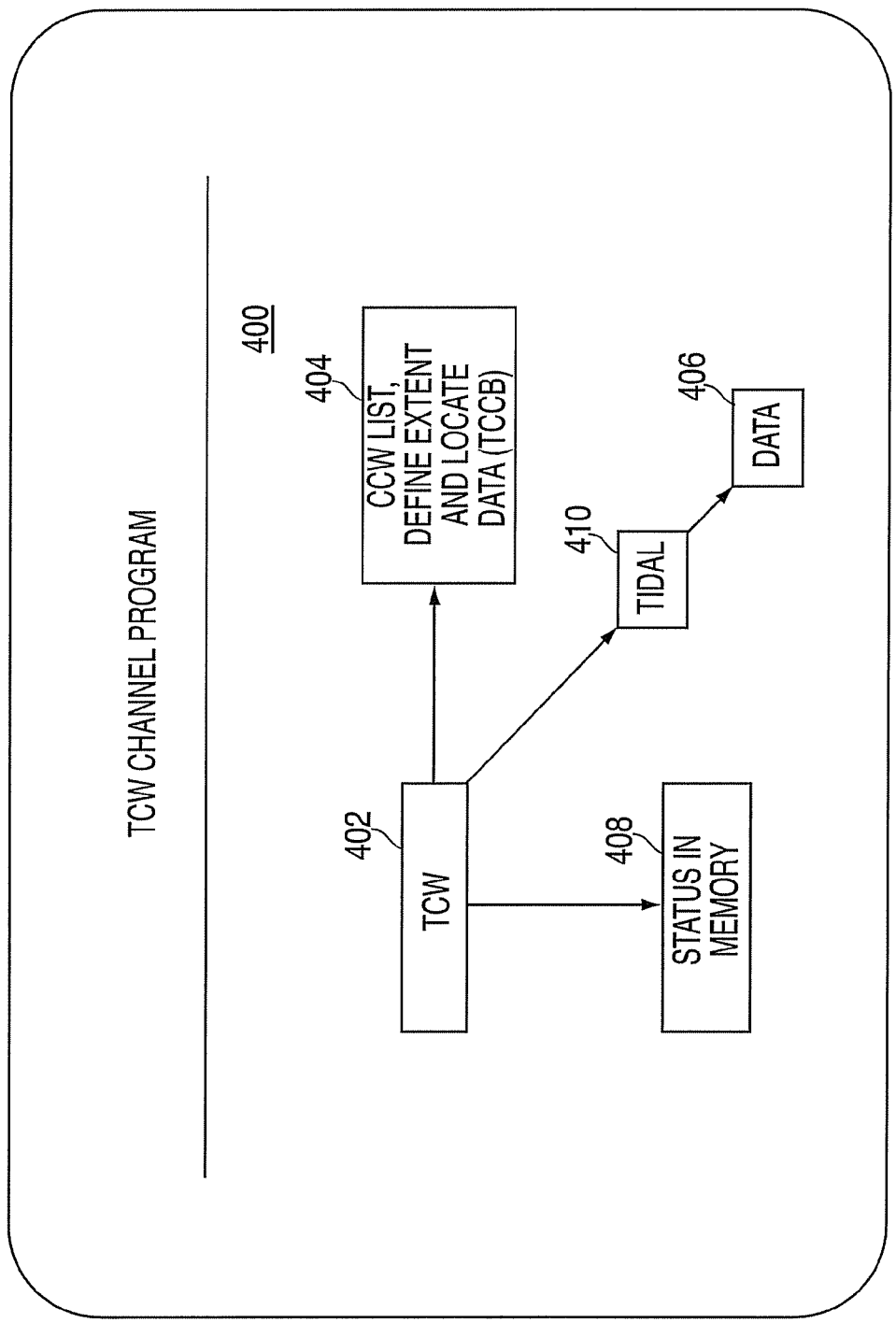
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are three communication sequences (see FIGS. 4-5), as compared to seven sequences for the CCW channel program (see FIGS. 2B-3).

Figure 6:
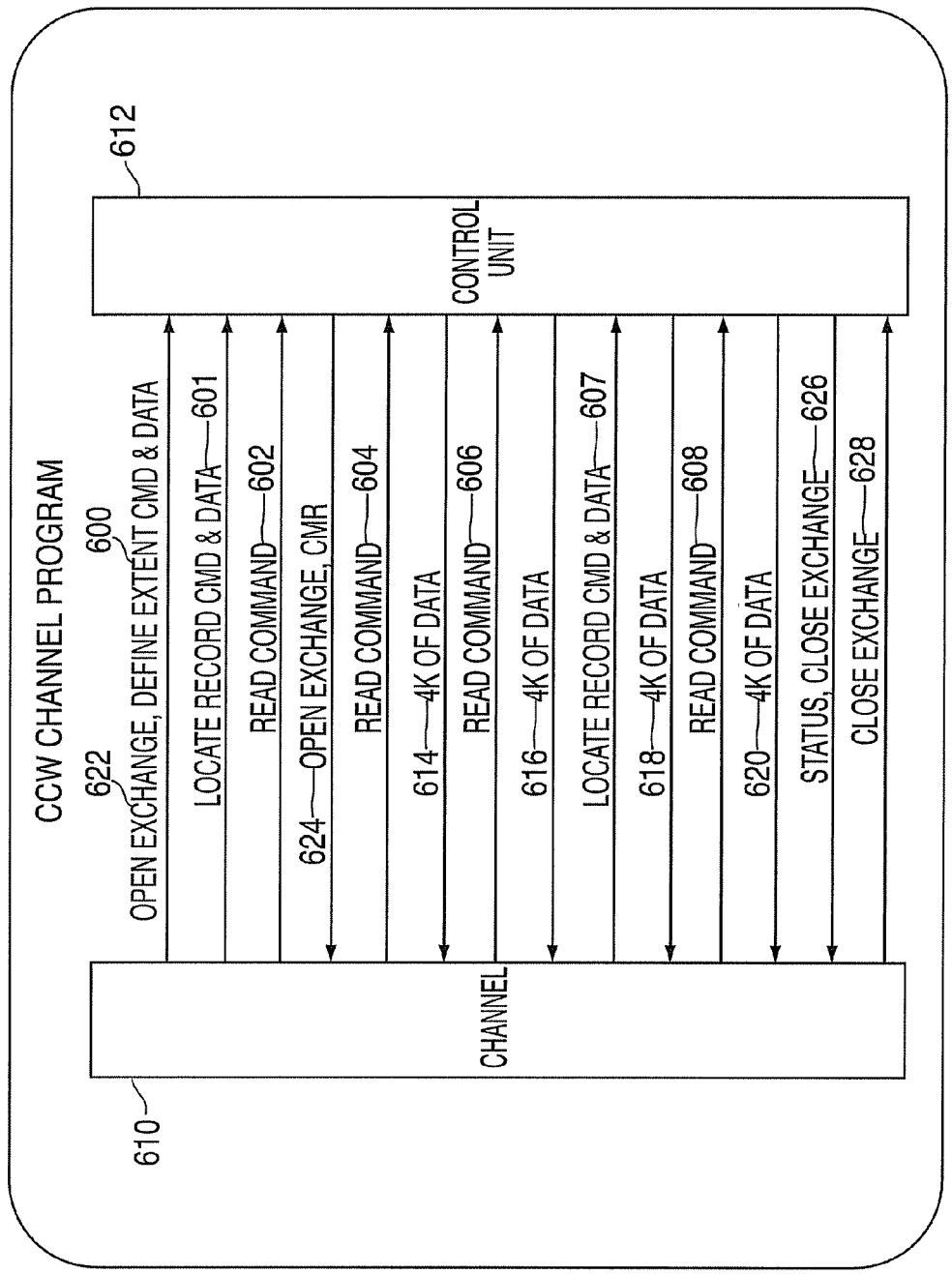
FIG. 6 depicts one embodiment of a prior art link protocol used to communicate between a channel and control unit in order to execute four read commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4 k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 7:
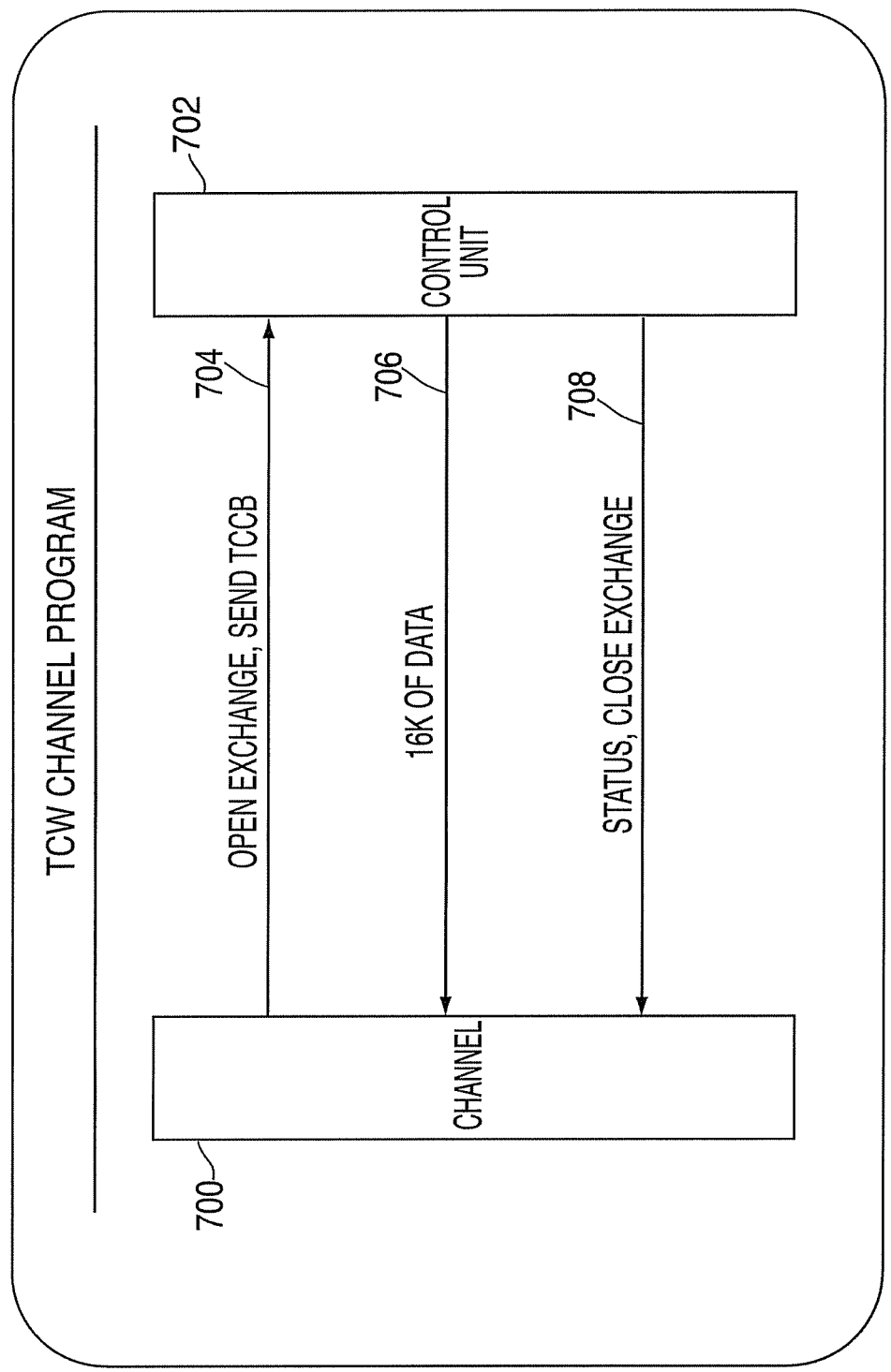
FIG. 7 depicts one embodiment of a link protocol used to communicate between a channel and control unit to process the four read commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16 k of data 706 to the channel 700. Additionally, the control unit 702 provides status to the channel 700 and closes the exchange 708. Thus, the TCW channel program requires much less communications to transfer the same amount of data as the CCW channel program of FIG. 6.

Figure 8:
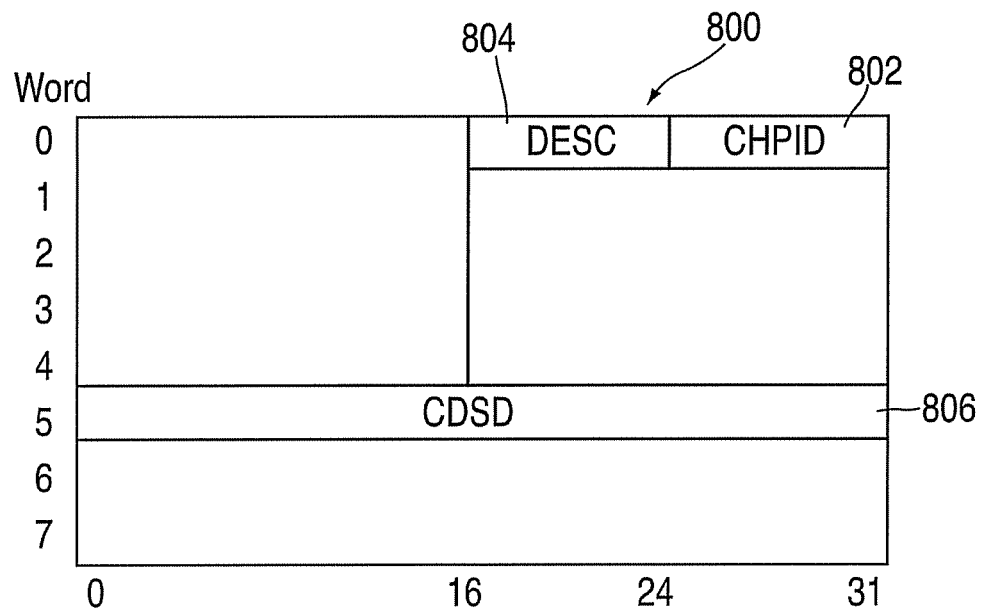
FIG. 8 depicts one embodiment of fields in a channel path description block, in accordance with an aspect of the present invention.

In one embodiment, the I/O processing system 100 of FIG. 1 executes both CCW channel programs and TCW channel programs on a per channel path 122 basis. Thus, while some control units 110 may only support legacy CCW channel programs, other control units 110 can support extended capability of interpreting and performing TCW channel programs. The channel subsystem 108 can track the capability of each channel path 122 and report the capability to OSs 103 or other programs executed by CPUs 104. For example, one of the OSs 103 may send a request to the channel subsystem 108 for a channel path description to establish the capability of channel path 122. The channel subsystem 108 can respond providing capability information for channel path 122. One example of a response to a request for a channel path description is depicted in FIG. 8, which illustrates a channel-path description block 800 in accordance with an exemplary embodiment. As shown in FIG. 8, the channel-path description block 800 includes a channel path identifier (CHPID) 802, a descriptor (DESC) 804, and channel description specific data (CDSD) 806. It will be understood that other fields can be included in the channel-path description block 800 which are not depicted in FIG. 8.

Figure 9:
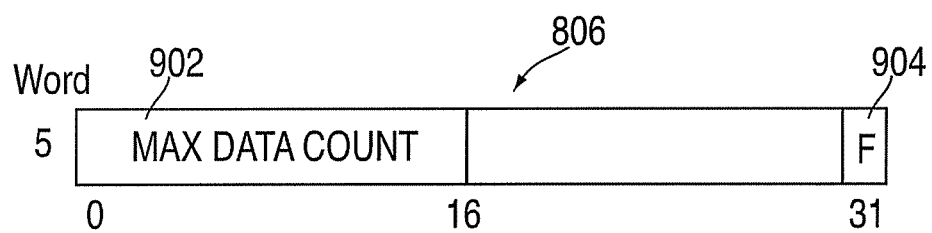
FIG. 9 depicts one embodiment of a channel description specification data field in a channel path description block, in accordance with an aspect of the present invention.

The CHPID 802 may be used to establish the channel path 122 associated with the channel-path description block 800. The definition of the CDSD 806 can vary based on the value of the DESC 804. For example, when the DESC 804 indicates that channel path 122 of FIG. 1 is capable of performing a command mode link protocol (e.g., supporting a Fibre Channel link protocol), and an extension to the link protocol is installed (e.g., Fibre Channel Extension (FCX) using transport mode), the CDSD 806 may be defined as shown in FIG. 9. In an exemplary embodiment depicted in FIG. 9, the CDSD 806 includes a max data count 902 and an F field 904. The F field 904 is an extension support indicator that specifies whether the channel path 122 supports an extension to the link protocol, for instance, FCX. The F field 904 may further indicate that the max data count 902 is valid. In an exemplary embodiment, when the max data count 902 is valid, it contains a 16-bit unsigned integer with a value that is the maximum count of customer data in units of 64K-bytes that the TCCB may transfer. The sum of the data byte count fields in all of the DCWs in a single transport command area (TCA) in a TCCB may not exceed this value. Thus, the count represented by the max data count 902 may be in the range of 65,536 to 4,294,901,760 bytes. The relationship of a TCA to a TCCB is further defined in reference to FIG. 10. When the F field 904 indicates that extension to the link protocol is not supported by the channel path 122, then values associated with the max data count 902 can have an alternate definition, e.g., set to a value of zero. According to an exemplary embodiment, a program interface in the host system 101 of FIG. 1, such as OS 103, interprets the amount of customer data that can be sent via the channel subsystem 108 from a single program-initiated operation when the extension to the link protocol is supported.

Figure 10:
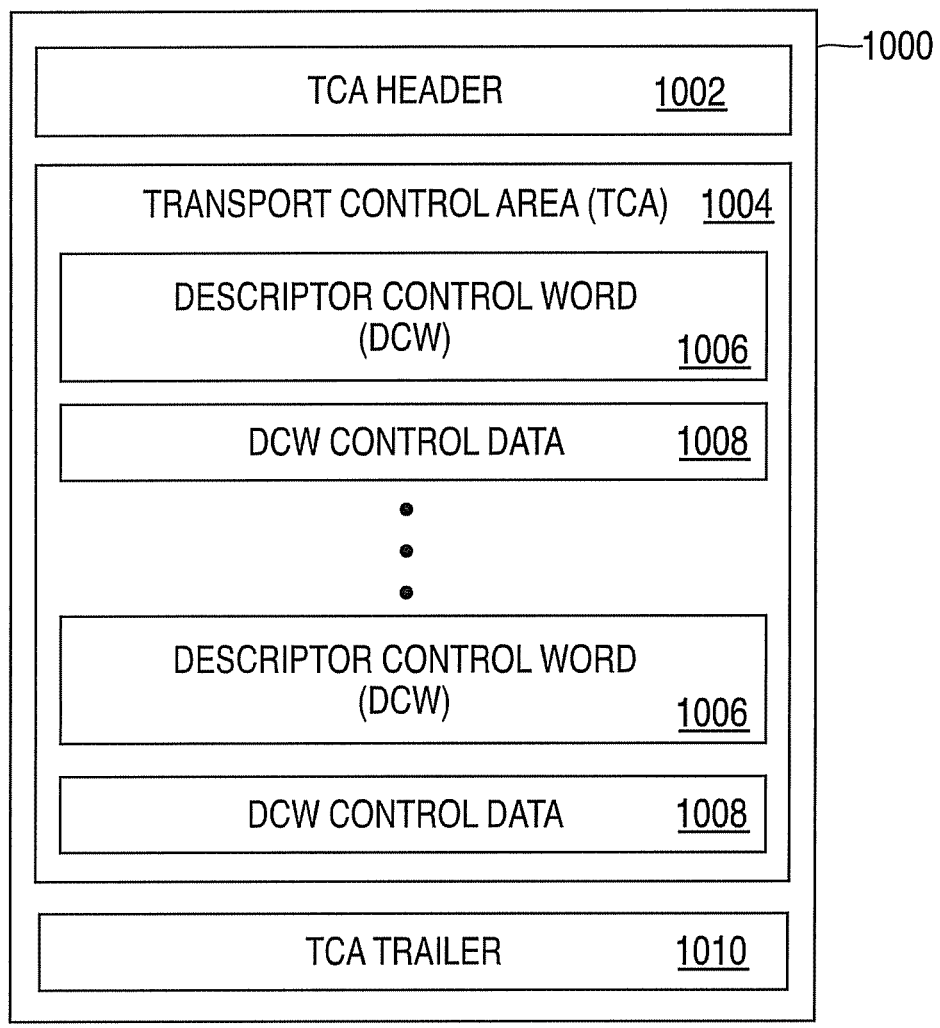
FIG. 10 depicts one embodiment of a transport command control block in accordance with an aspect of the present invention.

FIG. 10 depicts one embodiment of a TCCB 1000 in accordance with an aspect of the present invention. As described previously, the TCCB 1000 is a control block built by software and then the channel 124 sends it to a control unit 110 (e.g., in a Transport Command IU) for execution. The TCCB 1000 contains the commands to be executed by the control unit 110 and any control data required by the commands. The channel 124 does not look at the contents of the TCCB 1000. The channel 124 packages the TCCB 1000 and sends it to the control unit 110. This allows FCP transport protocols to be utilized instead of FICON, as an extension of the command set available for FICON. The TCCB 1000 is part of a TCW channel program, such as that depicted in FIGS. 4 and 7.

The TCCB 1000 includes a transport control area header (TCAH) 1002 which, in an exemplary embodiment, includes information about the transmit control area (TCA) 1004 and operations within the TCA 1004 (e.g., length, service code). In an exemplary embodiment the TCAH 1002 includes a format control field for specifying information such as the format of the TCCB (e.g., variable length CDB format), the mode associated with the TCCB (e.g., transport mode), service action codes set aside to be used as vendor unique code points, and a field to provide the control unit the priority in which to execute this TCCB 1000.

The TCCB 1000 depicted in FIG. 10 also includes a variable length TCA 1004 which includes one or more DCWs 1006 and corresponding DCW control data 1008, if any for each DCW 1006. As previously described, the max data count field 902 of FIG. 9 limits the maximum amount of customer data that a TCCB may transfer. The DCW control data 1008 may be of variable length. In an exemplary embodiment, each DCW 1006 includes a command code, flags (chaining), control data length (count), and read/write data length (count) fields. The sum of the read/write data length fields in all of the DCWs in a TCA may not exceed the max data count field 902. DCW control data 1008 is optional (depending on the DCW 1006) and includes control parameters for its corresponding DCW 1006. For example, DCW control data 1008 may include define extent and/or prefix parameters. In an exemplary embodiment, the DCW control data 1008 follows its corresponding DCW 1006 within the TCA 1004 and is not pointed to by the DCW 1006. In addition, the TCCB 1000 includes a TCA trailer (TCAT) 1010 that contains data such as the count of the bytes to be transferred by the TCCB 1000 and a check word field to check the integrity of the TCCB 1000.

Figure 11:
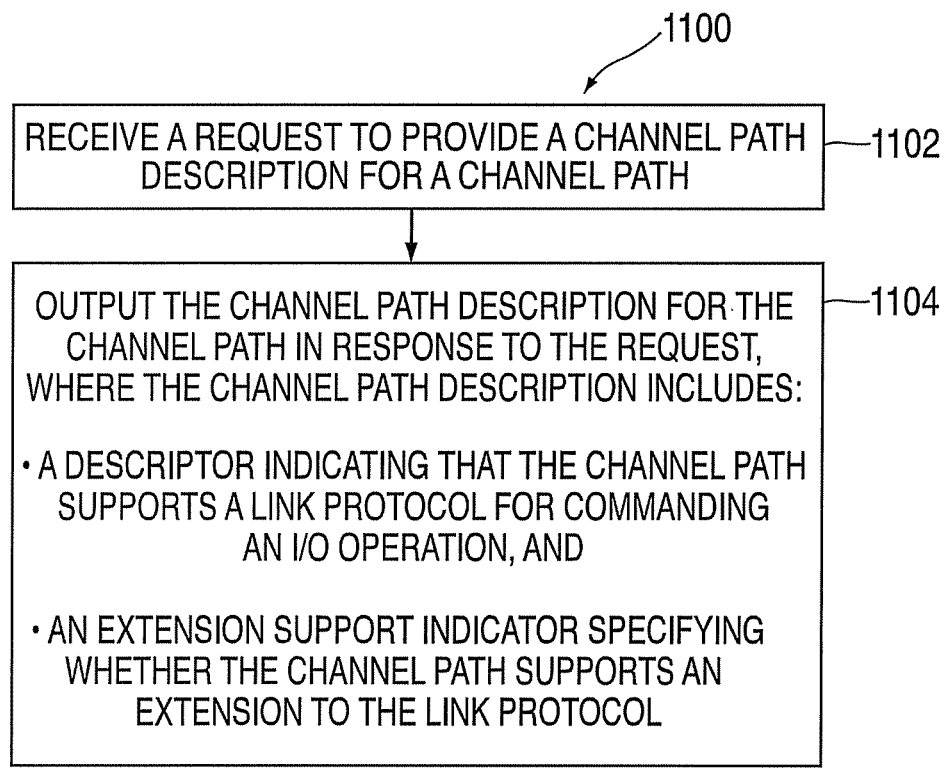
FIG. 11 depicts one embodiment of a process for determining extended capability of a channel path in an I/O processing system.

Turning now to FIG. 11, a process 1100 for determining extended capability of a channel path an I/O processing system will now be described in accordance with exemplary embodiments, and in reference to the I/O processing system 100 of FIG. 1. At block 1102, the channel subsystem 108 receives a request to provide a channel path description for channel path 122, where the channel path 122 includes channel 124 coupled to control unit 110. OS 103 may initiate the request. In an exemplary embodiment, the link protocol supports CCW channel programs and the extension to the link protocol supports TCW channel programs. For example, the link protocol can be Fibre Channel, and the extension is FCX.

At block 1104, the channel subsystem 108 outputs the channel path description, for instance, channel-path description block 800 of FIG. 8, for the channel path 122 in response to the request. The channel path description includes a descriptor (DESC 804) indicating that the channel path 122 supports a link protocol for commanding an I/O operation. The channel path description may also include an extension support indicator, for example, the F field 904 in CDSD 806, specifying whether the channel path 122 supports an extension to the link protocol. The channel subsystem 108 may output additional information in CDSD 806 associated with the descriptor in response to the request, where the CDSD 806 is defined as a function of the descriptor. For example, the CDSD 806 can be a field in the channel-path description block 800 that has different definitions depending upon the value of the DESC 804. The CDSD 806 may include the max data count 902 of FIG. 9 indicating a maximum count of customer data the TCCB may transfer, supported by the channel path 122 when communicating via the extension to the link protocol. The CDSD 806 can also include a validity indicator establishing validity of the max data count 902. In an exemplary embodiment, the extension support indicator is the validity indicator, e.g., F field 904 of FIG. 9 provides validity of the max data count 902 and indicates that the extension to the link protocol is supported.

Technical effects and benefits of exemplary embodiments include determining extended capability of a channel path in an I/O processing system. Using one or more fields in a channel path description block to define channel path capability allows software to determine the capability of the channel path such that properly formatted CCW or TCW channel programs can be executed. Advantages include support for both CCW channel programs and TCW channel programs on a channel path basis in the same I/O processing system. Further advantages include establishing a configurable maximum amount of customer data that can be transferred to or from the host by a sum of data counts in each DCW in a TCCB of a TCW channel program.

Figure 12:
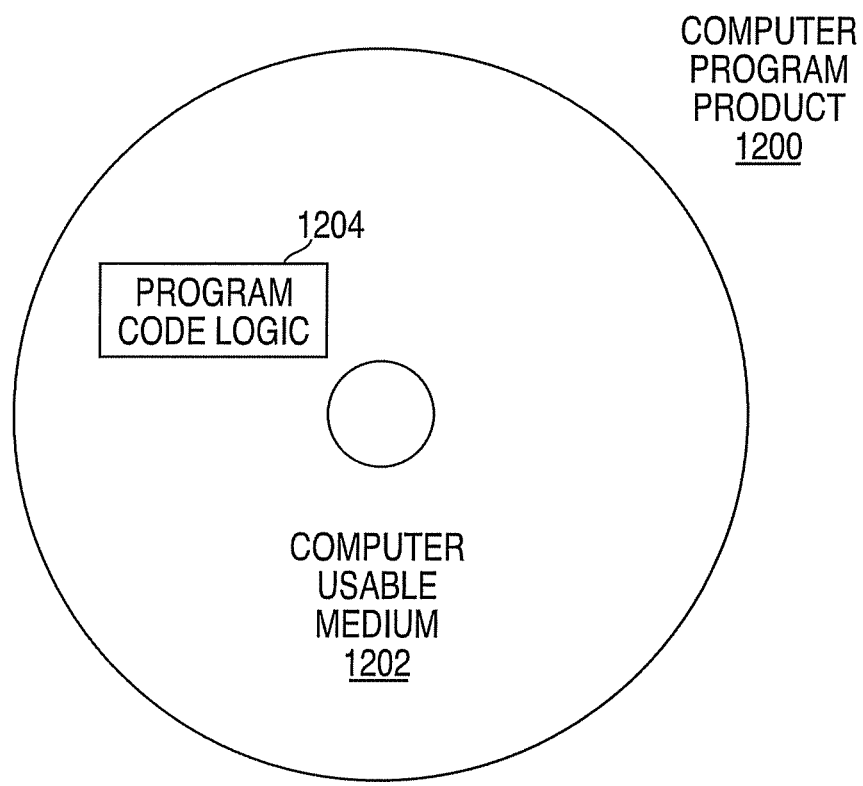
FIG. 12 depicts one embodiment of a computer program product incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1200 as depicted in FIG. 12 on a computer usable medium 1202 with computer program code logic 1204 containing instructions embodied in tangible media as an article of manufacture. Exemplary articles of manufacture for computer usable medium 1202 may include floppy diskettes, CD-ROMs, hard drives, universal serial bus (USB) flash drives, or any other computer-readable storage medium, wherein, when the computer program code logic 1204 is loaded into and executed by a computer, the computer becomes an apparatus for practicing the invention. Embodiments include computer program code logic 1204, for example, whether stored in a storage medium, loaded into and/or executed by a computer, or transmitted over some transmission medium, such as over electrical wiring or cabling, through fiber optics, or via electromagnetic radiation, wherein, when the computer program code logic 1204 is loaded into and executed by a computer, the computer becomes an apparatus for practicing the invention. When implemented on a general-purpose microprocessor, the computer program code logic 1204 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for determining extended capability of a channel path in an input/output (I/O) processing system, the computer program product comprising:
 a non-transitory tangible storage medium readable by a processing circuit and storing instructions for execution by the processing circuit for performing a method comprising:
 sending a request from a processing unit in a host computer system to a channel subsystem in the host computer system, the request to provide a channel path description for a channel path between the channel subsystem and an I/O device, the channel subsystem configured to be coupled to a control unit via the channel path, the channel configured to control information transfer between the channel subsystem and the I/O device; and
 receiving channel path capability information by the processing unit from the channel subsystem in response to the request, the capability information specified by a channel path description block including channel path identification and description information, the channel path description block specifying whether the channel path supports a Fibre Channel protocol for commanding an I/O operation, the channel path description block specifying whether the channel path supports an extension to the Fibre Channel protocol based on the channel path supporting the Fibre Channel protocol.

2. The computer program product of claim 1, wherein the channel path description block includes a channel path identifier (CHPID) field, a descriptor field (DESC) indicating whether the channel path supports the Fibre Channel protocol, and an extension support indicator field (F) specifying whether the channel path supports the extension to the Fibre Channel protocol.

3. The computer program product of claim 2, wherein, based on the channel path supporting the Fibre Channel protocol and the extension to the Fibre Channel protocol being installed, the extension support indicator field (F) is contained within a channel description specific data (CDSD) field.

4. The computer program product of claim 3, wherein, based on the channel path descriptor field (DESC) not indicating that the channel path is capable of performing both a command mode link protocol supporting the Fibre Channel protocol and an extension to the Fibre Channel protocol using transport mode, the channel description specific data (CDSD) field is absent the extension support indicator field (F).

5. The computer program product of claim 3, wherein in response to the extension support indicator field (F) being '1', the CDSD includes a maximum data count field indicating a maximum count of a sum of data count fields in all device control words (DCWs) in a transport command area (TCA) of a command message supported by the channel path when communicating via the extension to the Fibre Channel protocol.

6. The computer program product of claim 1, wherein the Fibre Channel protocol supports channel command word (CCW) channel programs configured to support at least one CCW that specifies a command for performing an I/O operation, and the extension to the Fibre Channel protocol supports transport control word (TCW) channel programs configured to support at least one transport command control block (TCCB), the TCCB configured to be sent from the channel subsystem to the control unit and configured to hold a plurality of commands for performing an I/O operation.

7. The computer program product of claim 2, wherein the descriptor field indicates that the channel path supports the Fibre Channel protocol, and the extension support indicator field is included in a channel description specific data (CDSD) field that is defined as a function of the descriptor field.

8. The computer program product of claim 5, wherein the TCA is configured to be included in a transport command control block (TCCB) sent from a channel to a control unit, the TCA comprising one or more DCWs, and wherein the maximum data count field represents a number of 64K bytes of data.

9. An apparatus for determining extended capability of a channel path in an input/output (I/O) processing system, the apparatus comprising:
    a processing unit in a host computer system, the processing unit configured to control functions of at least a portion of the I/O processing system, the processing unit configured to perform a method comprising:
    sending a request to a channel subsystem in the host computer system, the request to provide a channel path description for a channel path between the channel subsystem and an I/O device, the channel subsystem configured to communicate with a control unit via the channel path, the channel subsystem configured to be coupled to the control unit via the channel path, the channel configured to control information transfer between the channel subsystem and an I/O device; and
    receiving channel path capability information by the processing unit from the channel subsystem in response to the request, the capability information specified by a channel path description block, the channel path description block including channel path identification and description information, the channel path description block specifying whether the channel path supports a Fibre Channel protocol for commanding an I/O operation, the channel path description block specifying whether the channel path supports an extension to the Fibre Channel protocol based on the channel path supporting the Fibre Channel protocol.

10. The apparatus of claim 9, wherein the channel path description block includes a channel path identifier (CHPID) field, a descriptor field (DESC) indicating whether the channel path supports the Fibre Channel protocol, and an extension support indicator field (F) specifying whether the channel path supports the extension to the Fibre Channel protocol.

11. The apparatus of claim 10, wherein the descriptor field indicates that the channel path supports the Fibre Channel protocol, and the extension support indicator field (F) is included in a channel description specific data (CDSD) field that is defined as a function of the descriptor field.

12. The apparatus of claim 11, wherein in response to the extension support indicator field (F) being '1', the CDSD includes a maximum data count field indicating a maximum count of a sum of data count fields in all device control words (DCWs) in a transport command area (TCA) of a command message supported by the channel path when communicating via the extension to the Fibre Channel protocol.

13. The apparatus of claim 12, wherein the TCA is configured to be included in a transport command control block (TCCB) sent from a channel to a control unit, the TCA comprising one or more DCWs, and wherein the maximum data count field represents a number of 64K bytes of data.

14. The apparatus of claim 9, wherein the Fibre Channel protocol supports channel command word (CCW) channel programs configured to support at least one CCW that specifies a command for performing an I/O operation, and the extension to the Fibre Channel protocol supports transport control word (TCW) channel programs configured to support at least one transport command control block (TCCB), the TCCB configured to be sent from the channel subsystem to the control unit and configured to hold a plurality of commands for performing an I/O operation.

15. A method for determining extended capability of a channel path in an input/output (I/O) processing system, the method comprising:
    sending a request from a processing unit in a host computer system to a channel subsystem in the host computer system, the request to provide a channel path description for a channel path between the channel subsystem and an I/O device, the channel subsystem configured to be coupled to a control unit via the channel path, the channel configured to control information transfer between the channel subsystem and the I/O device; and
    receiving channel path capability information by the processing unit from the channel subsystem in response to the request, the capability information specified by a channel path description block including channel path identification and description information, the channel path description block specifying whether the channel path supports a Fibre Channel protocol for commanding an I/O operation, the channel path description block specifying whether the channel path supports an extension to the Fibre Channel protocol based on the channel path supporting the Fibre Channel protocol.

16. The method of claim 15, wherein the channel path description block includes a channel path identifier (CHPID) field, a descriptor field (DESC) indicating whether the channel path supports the Fibre Channel protocol, and an extension support indicator field (F) specifying whether the channel path supports the extension to the Fibre Channel protocol.

17. The method of claim 16, wherein the extension support indicator field (F) is contained within a channel description specific data (CDSD) field, wherein in response to the extension support indicator field (F) being '1', the CDSD includes a maximum data count field indicating a maximum count of a sum of data count fields in all device control words (DCWs) in a transport command area (TCA) of a command message supported by the channel path when communicating via the extension to the Fibre Channel protocol.

18. The method of claim 17, wherein in response to the extension support indicator field (F) being '0', the maximum data count field has a value of '0'.

19. The method of claim 15, wherein the Fibre Channel protocol supports channel command word (CCW) channel programs configured to support at least one CCW that specifies a command for performing an I/O operation, and the extension to the Fibre Channel protocol supports transport control word (TCW) channel programs configured to support at least one transport command control block (TCCB), the TCCB configured to be sent from the channel subsystem to the control unit and configured to hold a plurality of commands for performing an I/O operation.

20. The method of claim 16, wherein the descriptor field indicates that the channel path supports the Fibre Channel protocol, and the extension support indicator field (F) is included in a channel description specific data (CDSD) field that is defined as a function of the descriptor field.

\* \* \* \* \*